United States Patent
King-DeBaun

(12) 
(10) Patent No.: US 6,285,299 B1
(45) Date of Patent: Sep. 4, 2001

(54) SOFT COVER ADAPTER FOR COMPUTER KEYBOARD

(76) Inventor: Pati King-DeBaun, P.O. Box 3358, Park City, UT (US) 84060

(*) Notice: Subject to any disclaimer, the term of this patent is extended or adjusted under 35 U.S.C. 154(b) by 0 days.

(21) Appl. No.: 09/280,624

(22) Filed: Mar. 29, 1999

(51) Int. Cl.$^7$ .......................... H03K 17/94; H03M 11/00
(52) U.S. Cl. .................. 341/23; 400/714; 400/479.1; 150/154; 150/165; 235/145 R
(58) Field of Search .................... 341/34, 23; 400/479.1, 400/490, 714; 150/154, 165; 235/145 R; D14/455

(56) References Cited

U.S. PATENT DOCUMENTS

| | | | |
|---|---|---|---|
| D. 291,697 | * 9/1987 | Duffin | D14/455 |
| D. 291,993 | * 9/1987 | Duffin | D14/455 |
| D. 353,369 | * 12/1994 | Leibengood | D14/455 |
| 4,060,163 | * 11/1977 | Willingham | 400/714 |
| 4,075,465 | * 2/1978 | Funk | 235/145 R |
| 4,314,116 | * 2/1982 | Gordon | 200/5 A |
| 4,439,757 | * 3/1984 | Gross | 341/23 |
| 4,922,980 | * 5/1990 | Parker | 150/165 |
| 5,183,346 | * 2/1993 | Tesar | 400/490 |
| 5,514,855 | * 5/1996 | Sullivan | 235/145 R |
| 5,551,497 | * 9/1996 | Stanley | 150/154 |
| 5,887,995 | * 3/1999 | Holchan | 400/479.1 |
| 5,988,902 | * 11/1999 | Holchan | 400/479.1 |

* cited by examiner

*Primary Examiner*—Michael Horabik
*Assistant Examiner*—Albert K. Wong
(74) *Attorney, Agent, or Firm*—Arthur S. Cookfair

(57) ABSTRACT

A soft cover adapter for customizing and/or simplifying the use of a computer keyboard comprises an easily attachable soft cover made of cloth, vinyl, leather, or the like, configured in size and shape to cover a computer keyboard. The cover may be attached to the keyboard by means of elastic banding. A multiplicity of plastic discs are removably attached (for example, by hook and loop attachments) to the inside surface of the cover. Each of the plastic discs is removably positioned above a pre-selected group of keys on the computer keyboard. On the outer surface of the cover, an icon, such as a photo, drawing, letter, word, or other symbol is positioned above each disc so that when the icon is depressed, it will, in turn, depress the corresponding plastic disc, which, in turn, will depress one or more of the pre-selected group of keys beneath it. In practice, when an appropriate software program is installed in a personal computer and the soft cover adapter is placed over the keyboard, pressure on one of the icons will result in a pre-determined screen change.

14 Claims, 3 Drawing Sheets

SOFT COVER ADAPTER FOR COMPUTER KEYBOARD

BACKGROUND OF THE INVENTION

1. Field of the Invention

The present invention relates to a cover device for customizing and/or simplifying the use of a computer keyboard to render the keyboard more suitable for specific uses and for users who require a simplified keyboard design.

2. Prior Art

Keyboards for personal computers are typically designed with the primary portion of the keyboard comprising individual letter keys arranged in a pattern similar to that used for typewriters, that is, the so-called "QWERTY" pattern. In addition a standard computer keyboard will contain a number of function keys, or command keys, to control various functions of the computer. The keys are relatively small and the operation of the keyboard requires a degree of skill and dexterity similar to that required for the operation of a typewriter. For some users, especially young children or persons with various mental or physical disabilities, a standard computer keyboard may be confusing, or may require too high a level of skill and/or manual dexterity. This problem has led to the development of devices for adapting standard keyboards to provide a simplified input keyboard offering a fewer number of keys and keys that are larger in size. Others have developed alternative keyboards specifically designed for persons with limited skill and/or manual dexterity.

U.S. Pat. No. 5,514,855 discloses a computer keyboard adapter device providing large size key surfaces in the form of a molded rigid panel designed to fit over a standard keyboard. The panel is provided with a plurality of oversized keys, each of which, when depressed will, in turn, depress on or more of a select group of keys on the standard keyboard beneath it. The keyboard adapter is designed for use with a specialized children's software application.

U.S. Pat. No. 4,158,130 discloses an auxiliary keyboard assembly for changing the key configuration of the keyboard of a data terminal device. The assembly includes a rigid cover which may be mounted on the keyboard of a data terminal device and a number of auxiliary keys held in predetermined position to operate associated control keys in the terminal device keyboard.

U.S. Pat. No. 5,092,459 discloses a transparent plastic case for encapsulation of a remote control unit to shield the pushbuttons and protect them from contact with foreign substances, especially liquids or foods. the case has a number of deflectable pads, individually depressible to operate an associated push-button on the control unit. The plastic case may be held in place with the aid of VELCRO™ patches.

U.S. Pat. No. 5,551,497 discloses a decorative two part cover assembly for computer keyboards, comprising a body covering portion and a key covering portion. The body covering portion may be held in place by elastic banding and/or hook and loop fastening strips. The key covering portion may be held in place by hook and loop fastening strips. The cover assembly material may be a textile fabric, leather, vinyl, or the like.

Simplified and/or customized keyboards for use with small children or individuals with disabilities are available from Intellitools®, Inc. in the form of alternative keyboards. The Intellikeys® alternative keyboards may be used in place of a standard keyboard and provide various "keyboards" in the form of membrane overlays that may be used to customize settings for individual users. These alternative keyboards and their use are further disclosed in U.S. Pat. No. 5,450,078.

SUMMARY OF THE INVENTION

It is an object of this invention to provide a simple and low cost method and apparatus for adapting the keyboard of a personal computer to render it more suitable for small children or persons with limited skill or manual dexterity.

It is a further object of this invention to provide keyboard cover device that may be conveniently attached to the keyboard or alternative keyboard of a personal computer to modify or customize its use for specific users and which also may be conveniently removed to return the keyboard to its standard or conventional mode.

Other objects of the invention will be apparent from the following description of the invention.

Briefly, the present invention provides an easily attachable, keyboard cover assembly for adapting and simplifying the input to a computer keyboard. The keyboard cover assembly comprises a cover formed of a flexible material having an upper surface and a lower surface, shaped to cover a computer keyboard; a plurality of plates, removably attached to the lower surface of the cover; a plurality of identifying icons, removably attached to the upper surface of the cover with each of the icons being positioned above one of the plates; attaching means for removably attaching the cover material to the computer keyboard in such a manner as to align each of plates above a pre-selected key or group of keys so that each pre-selected key or group of keys is responsive to pressure from the plate above which, in turn, is responsive to pressure from the icon above. With the cover assembly in place, a simplified keyboard input is provided for use in conjunction with a software application for children or persons with limited mental acuity or manual dexterity. The cover assembly may be used to adapt various keyboards with either an IBME type or MacIntosh® personal computer.

The flexible cover material may be selected from a variety of materials including, for example, a textile fabric, leather, a polymeric material such as vinyl, polyurethane, etc., or other similar material.

The plates, removably attached to the lower surface of the flexible cover material, are of a material sufficiently hard to serve effectively to transmit pressure to the key or keys over which they are positioned. Suitable materials include, for example, wood, metal, cardboard, ceramic, or various plastics. The plate may be circular, rectangular, or other shape. Typically, the plate is in the form of a hard plastic disc similar to the form of a poker chip. The plate may be attached to the lower surface of the cover material by various means, such as snap buttons, or the like. Preferably, the plates are attached to the underside of the cover material by means of hook and loop fasteners, for example, of the type of material sold under the trademark VELCRO.

The icons on the upper surface of the cover material may be in the form of photos, drawings, or other images or designs appropriate to the particular program and or user and may be on paper, cardboard, plastic or the like and are removably attached and repositionable on the upper surface of the cover material. If desired, the icons may be in the form of a three dimensional object, such as a miniature animal, or a geometric shape such as a cube, pyramid, etc., or a miniature model of a car, house, etc.

The cover of the keyboard cover assembly is made of a flexible sheet material comformable to the size and shape of a key board, preferably a material that can be sewn, such as a textile fabric. The specific size and shape of the cover will depend on the size and shape of the computer keyboard that it is intended to cover. The cover may be constructed as a single unit or may be of two or more separable pieces. In the latter instance, the cover may, for example, constitute two parts: 1) a body portion, for example, a cover that envelopes the sides and all or part of the bottom to the computer keyboard and the top perimeter, leaving the keys uncovered; and 2) a key covering portion holding the plates and icons described hereinabove and constructed to be removably attachable to the body portion. The body portion may be removably attached to the computer keyboard by elastic banding, hook and loop fastener, or other easily removable fastening methods or devices. Similarly, the key covering portion may be attached to the body portion by such easily openable devices as snap buttons, hook and loop fasteners or the like. Preferably, the cover is formed as a single unit, for example, of sewn fabric, covering the keys. In one embodiment, the cover may surround the keys, sides, and at least part of the bottom of the keyboard and be held in place by elastic banding—in the manner of a fitted sheet.

In a preferred embodiment, the portion of the cover that is positioned over the keys of the computer keyboard is made of or is faced on at least one side with a "soft loop" material, that is, a material that serves as the loop portion of a hook and loop fastener. Objects, such as icons and plates, having a patch of "hook" material adhered thereto may then be removably attached to the fabric. Such soft loop material, specifically designed for use in hook and loop fastening, is commercially available.

For most uses with standard computer keyboards, each of the plates and corresponding icons of the cover assembly will be associated with a specific group of keys and will thus, in effect, convert the keyboard to a simplified form with a fewer number of input sites, or "keys".

It is an advantage of the present invention that the cover assembly may be placed over a standard computer keyboard to convert it for use in a simplified mode, to interact, for example, with a specialized children's software application, and may then be easily removed to return the computer keyboard to its standard mode for other uses.

DETAILED DESCRIPTION OF THE INVENTION

Figure 1:
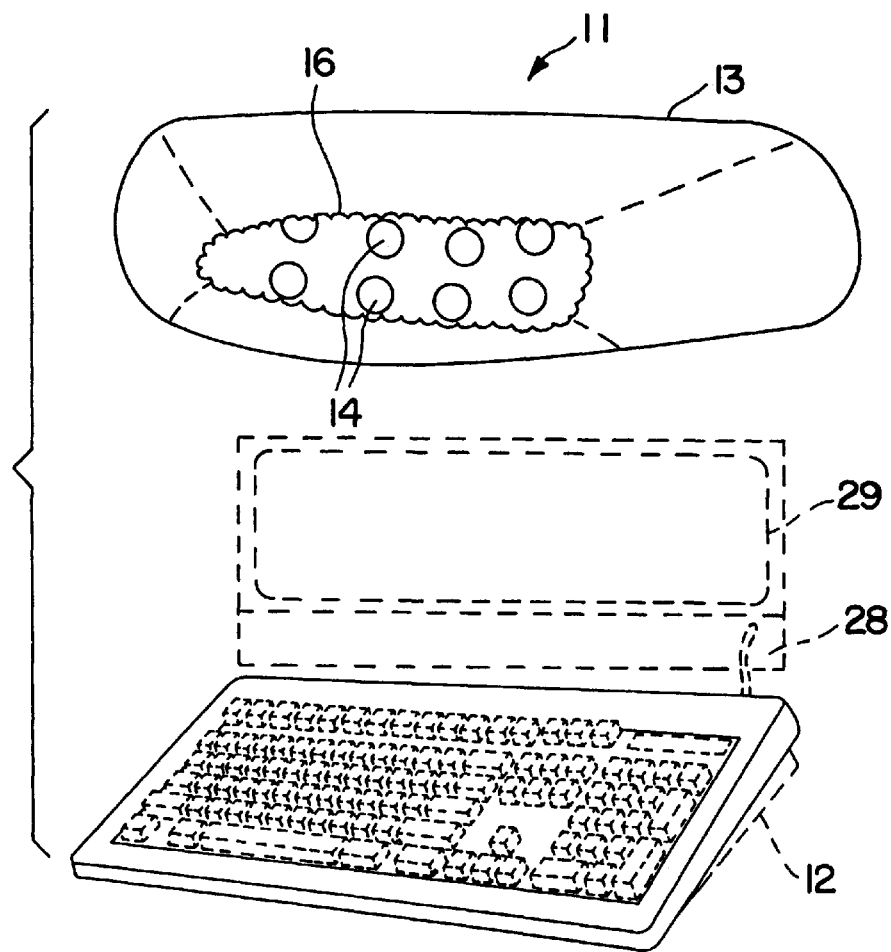
FIG. 1 shows a perspective view of a standard computer keyboard and a soft cover adapter of the present invention designed to fit over such a keyboard.
Figure 2:
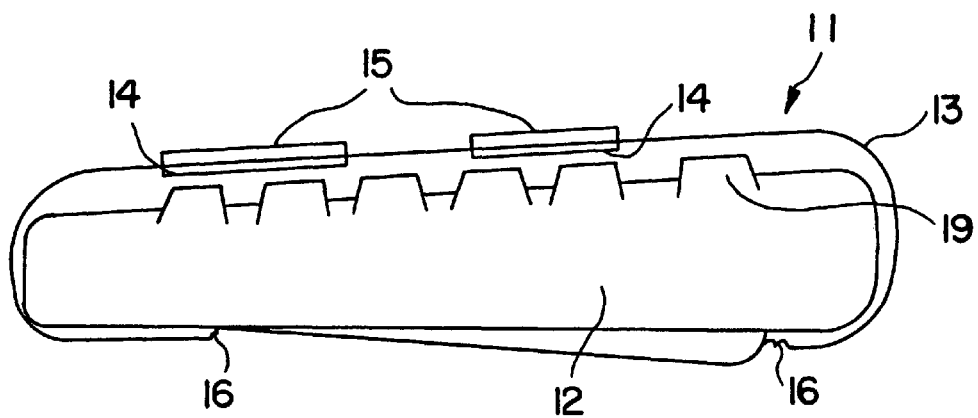
FIG. 2 shows a side sectional view of a computer keyboard covered by a soft cover adapter of the embodiment depicted in FIG. 1.

The preferred embodiment of the present invention, as depicted in FIGS. 1 and 2, comprises a keyboard cover assembly 11, of suitable size and shape to cover a standard computer keyboard 12 for use with a personal computer 28 and monitor 29. The keyboard cover assembly 11, comprises a cover 13 which may be formed from a single piece of flexible material or more than one piece of material such as a textile material, leather, a polymeric material, such as vinyl, polyurethane, and the like, or other suitable material which may be sewn or otherwise fastened together to form a single unit. When the cover 13 is fitted around the keyboard 12 it is held in position by means of elastic banding 16.

On the underside of cover 13 a multiplicity of plates 14 are removably attached. On the outside of cover 13 a multiplicity of icons 15 are removably attached. The removable attachment of icons 15 and plates 14 may be made by various methods, such as removable glue, snapbuttons, and the like. The preferred form of removable attachment is a hook and loop fastener, for example, of the type available under the trademark VELCRO. The removable attachment may then be made, in a known manner, by affixing one portion of the fastener, such as the hook, to the object being attached, such as the plate or icon, and providing the other portion, i.e. the loop portion, to the cover in the form of patches or fastening strips. Alternatively, the cover, or at least the portion of the cover where the attachments are may be made of a hook and loop sensitive fabric that allows objects having the hook portion of the fastener to be removably attached directly to the fabric.

The exact shape of the plates 14 may vary and may be in the form of discs, shown, or may be rectangular, or other shape. The plates are of a material such as wood, ceramic, cardboard, plastic, etc. that is sufficiently hard to allow pressure thereon to be transmitted to the key or keys over which they are positioned in use. The icons 15 may be in the form of photos, drawings, or various symbols, on paper, cardboard, or other substrate, or may be in the form of a three dimensional object, selected as appropriate with respect to the particular software program being used.

Figure 3:
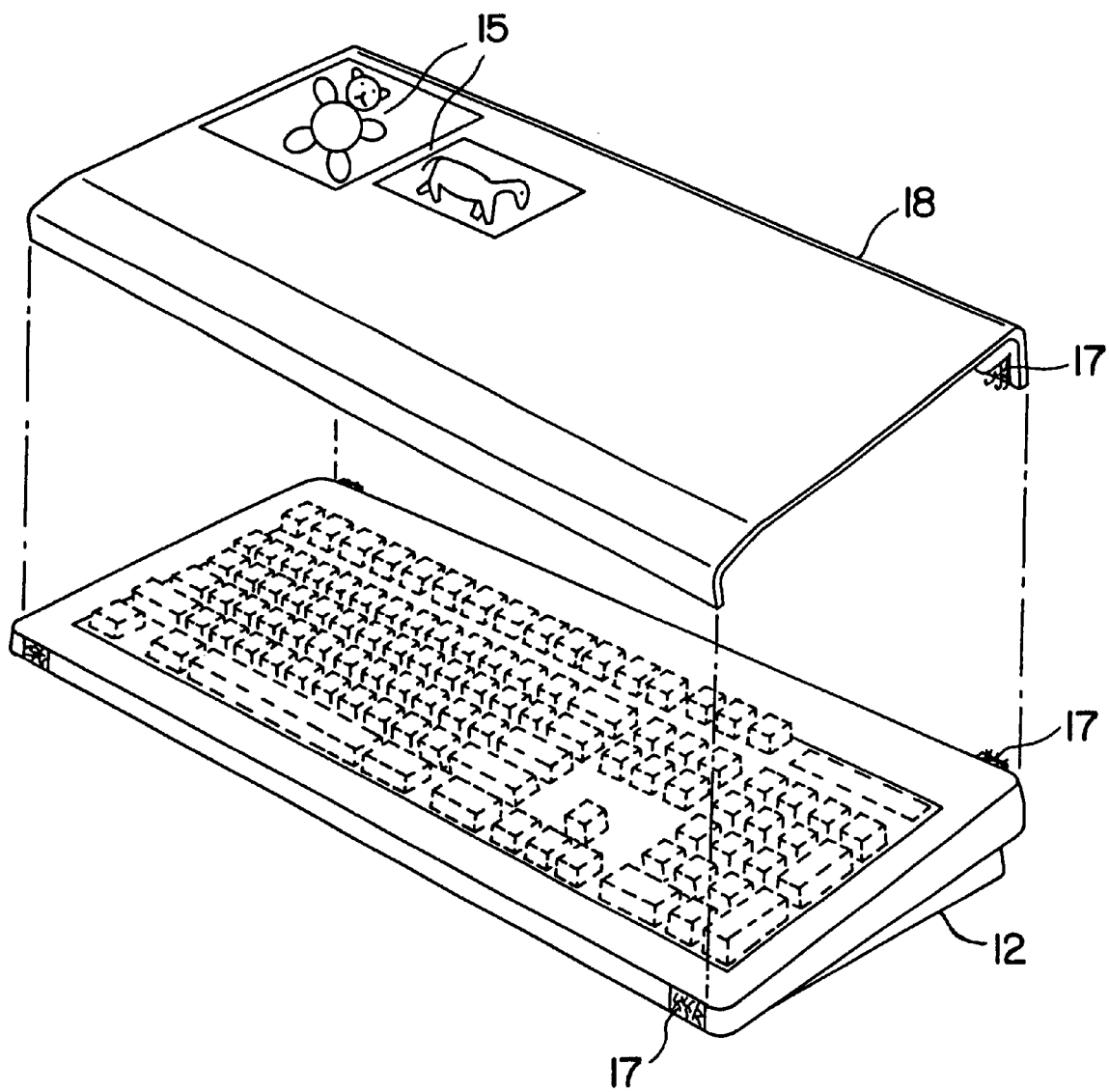
FIG. 3 shows a perspective view of a standard computer keyboard and an alternate embodiment of the soft cover adapter of the invention utilizing a different attaching means.

In an alternate embodiment, as shown in FIG. 3, the cover 18 may simply cover the upper face of the computer keyboard 12 and be attached directly thereto by fasteners 17. In the embodiment shown, the cover 18 is open at the ends of the keyboard. Fasteners 17 may of various types, for example, snap buttons, hook and loop fasteners or other. The preferred fasteners in this embodiment are hook and loop fasteners with one component of the fastener, e.g. the loop, being on the computer keyboard and the other component, e.g. the hook, being on the cover.

Figure 4:
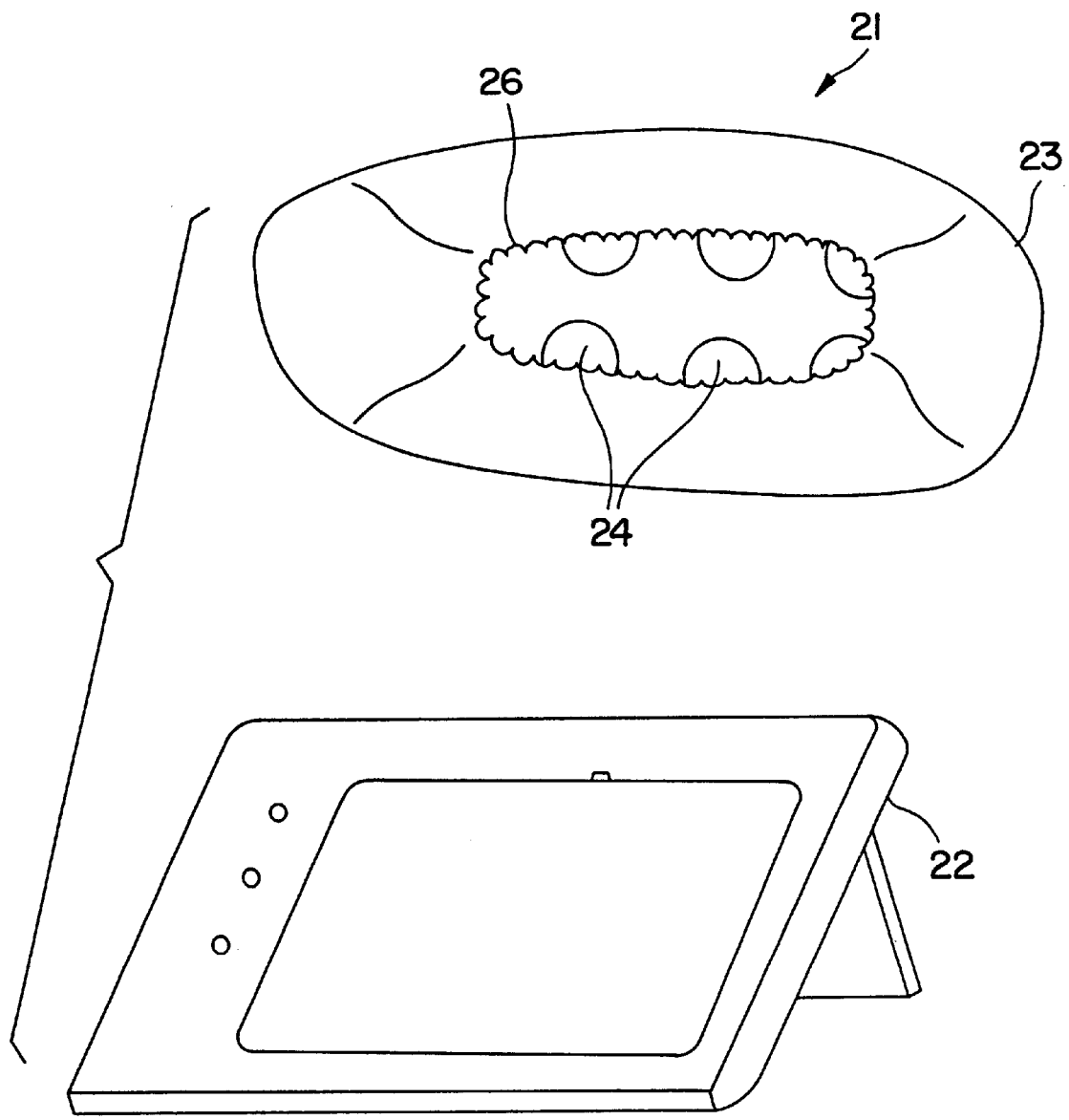
FIG. 4 shows a perspective view of an alternative keyboard and a soft cover adapter appropriately sized and shaped to fit over it.

The soft cover adapter of the present invention may be used with various types of computer keyboards. For example, in addition to the standard computer keyboard 12 as depicted in FIG. 1, it may be used as an adapter with alternative keyboard 22 as shown in FIG. 4. The soft cover adapter assembly 21 is similar to the cover assembly 11 in FIG. 1 except that cover assembly 21 has been sized and shaped to fit a different size keyboard, i.e. the alternative keyboard 22. In practice, cover assembly 21 is placed around the alternative keyboard 22 and positioned to place the plates 24 over the selected "key" or input sites, and held in place by means of elastic banding 26.

Alternative keyboards, designed to replace the standard keyboard for use by children or by handicapped persons who lack the mental ability and/or physical dexterity to operate a standard keyboard are known and are commercially available, for example, from Intellitools, Inc. Such alternative keyboards are typically equipped with plastic overlays or membranes that present "keys" in the form of input sites represented by pictures or symbols on the plastic membrane. In practice, a number of such membranes may be required, each designed for use with a particular software program.

Using the soft cover adapter of the present invention, a single cover may be used and the nature and position of the icons and plates may be easily changed by simply removing and replacing and/or repositioning the icons and plates to conveniently adapt the cover to a different use, such as to a different software program.

EXAMPLE 1

A soft cover adapter similar to that shown in FIG. 1 was fabricated from surface wipable polyester canvas with the portion that is to be positioned over the keys being of a bonded fabric having a soft polyester outer surface with a nylon backing. The polyester surface was a "soft loop" surface suitable for removably bonding to an applied "hook" portion of a hook and loop fastener. To the nylon underside or inner surface of the fabric was glued several strips of soft loop material from hook and loop fastening strips. Eight plastic discs about ⅛ inch thick and about 1.5 inches diameter with a hook patch on one side were removably attached at pre-selected locations on the soft loop strips. On the soft loop outer surface of the fabric a selected icon, e.g. a photo, drawing, letter, word, or other symbol having a hook patch on the back was removably attached over a selected disc. Each of the eight plastic discs and corresponding icons were positioned to activate a specific group of input keys on the computer keyboard. Thus, to the user, the icons become large "keys". These large keys, when depressed by the user, transmit the pressure through the plastic disc to the corresponding group of input keys on the standard keyboard and cause a predetermined screen change on the monitor by means of the computer and software program. In this example, the eight plastic discs (and corresponding icons) are positioned to activate the input keys as follows: disc 1 activates keys 3,4,5,E,R; disc 2 activates keys 6,7,8,Y,U; disc 3 activates keys 9,0,-,O,P; disc 4 activates keys +,delete,},\; disc 5 activates keys S,D,F,X,C; disc 6 activates keys G,H,J,B,N; disc 7 activates keys K,L,;,<,>; and disc 8 activates, return, shift. The soft cover adapter and keyboard was then used in conjunction with a hyperstudio™ software authoring program available from Roger Wagner Publishing Co.

Depending on the requirements of a particular software program, the location and/or number of icons and plates may vary.

EXAMPLE 2

Following the general procedure of the example above, another soft cover adapter was designed and fabricated for use with alternative keyboards of the type described in U.S. Pat. No. 5,450,078 and sold by Intellitools, Inc. In this case the cover was designed of suitable size and shape to fit over the alternative keyboard and the icons and plates were positioned to activate the touch-activated positions on the alternative keyboard using an IntelliPics® program and overlay maker program from Intellitools, Inc.

Although the invention has been described with reference to certain embodiments thereof, it will be appreciated by those skilled in the art that modifications and variations may be made without departing from the spirit and scope of the invention as defined in the claims set forth below.

What is claimed is:

1. A keyboard adapter cover assembly, adapted for covering the keys of a computer keyboard, comprising a cover of flexible sheet material conformable to the size and shape of the keyboard having an outer surface and an inner surface; a plurality plates, removably attached to the inner surface; a plurality of icons, removably attached to the outer surface, each icon being positioned above one of the plates; attaching means for removably attaching the cover to the computer keyboard in such a manner as to align each of the plates above a preselected key or group of keys of the computer keyboard so that each pre-selected key or group of keys is responsive to pressure from the plate above, which, in turn, is responsive to pressure from the icon above.

2. A keyboard adapter cover assembly according to claim 1 wherein each plate is removably attached to said inner surface of the cover by means of hook and loop fasteners.

3. A keyboard adapter cover assembly according to claim 1 wherein each icon is removably attached to said outer surface of the cover by means of hook and loop fasteners.

4. A keyboard adapter cover assembly according to claim 1 wherein at least a portion of said flexible fabric material is a textile fabric.

5. A keyboard adapter cover assembly according to claim 1 wherein said cover is attached to the keyboard by elastic banding.

6. A keyboard adapter cover assembly according to claim 1 wherein said cover is attached to the computer keyboard by at least one hook and loop fastener.

7. A keyboard adapter cover assembly according to claim 1 further comprising said computer keyboard.

8. A keyboard adapter cover assembly according to claim 3 wherein at least a portion of said cover whereon said icons are removably attached is made of a loop fabric receptive to hook fasteners.

9. A keyboard adapter cover assembly according to claim 7 wherein said computer keyboard is a standard computer keyboard.

10. A keyboard adapter cover assembly according to claim 7 wherein said computer keyboard is an alternative keyboard.

11. A keyboard adapter cover assembly according to claim 7 wherein said pre-selected key or group of keys, in response to pressure from the plate and icon in alignment thereabove, serves to generate signals, recognizable as input by a software program, to a personal computer.

12. A keyboard adapter cover assembly, for covering the keys of a personal computer keyboard to adapt said keyboard for use with various software programs; comprising a cover of flexible sheet material conformable to the size and shape of the keyboard, having an outer surface and an inner surface; a plurality of plastic discs removably attached by means of hook and loop fasteners to the inner surface; a plurality of icons, removably attached to the outer surface by means of hook and loop fasteners; each icon being positioned in alignment above a related plastic disc; said cover being removably attachable to the computer keyboard in such a manner as to align each icon and the related plastic disc above a pre-selected key or group of keys of the computer keyboard so that each pre-selected key or group of keys is responsive to pressure from the plastic disc and icon in alignment thereabove to generate signals recognizable as input to a software program for operating a personal computer.

13. A keyboard adapter assembly according to claim 12 wherein said personal computer keyboard is a standard computer keyboard.

14. A keyboard adapter assembly according to claim 12 wherein said personal computer keyboard is an alternative keyboard.

* * * * *